(12) United States Patent
Palmer et al.

(10) Patent No.: US 7,752,450 B1
(45) Date of Patent: Jul. 6, 2010

(54) LOCAL CACHING OF ONE-TIME USER PASSWORDS

(75) Inventors: Matthew Palmer, Menlo Park, CA (US); Rod Murchison, San Jose, CA (US); Sampath Srinivas, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1311 days.

(21) Appl. No.: 11/226,520

(22) Filed: Sep. 14, 2005

(51) Int. Cl.
*G06F 21/00* (2006.01)
(52) U.S. Cl. ........................................ 713/183; 726/21
(58) Field of Classification Search ................ 726/6, 726/8, 9, 12, 21; 713/183, 184; 705/72, 705/18; 340/5.54; 725/30
See application file for complete search history.

(56) References Cited

U.S. PATENT DOCUMENTS

| | | | |
|---|---|---|---|
| 6,715,082 B1 * | 3/2004 | Chang et al. ................... 726/8 |
| 6,871,286 B1 * | 3/2005 | Cagle et al. ..................... 726/5 |
| 7,336,960 B2 * | 2/2008 | Zavalkovsky et al. ........ 455/453 |
| 2001/0037400 A1 | 11/2001 | Raz et al. |
| 2002/0116355 A1 * | 8/2002 | Roschelle et al. ............. 706/62 |
| 2003/0136837 A1 * | 7/2003 | Amon et al. ................. 235/435 |
| 2004/0168066 A1 * | 8/2004 | Alden ......................... 713/182 |
| 2005/0138380 A1 * | 6/2005 | Fedronic et al. .............. 713/172 |
| 2007/0006291 A1 * | 1/2007 | Barari et al. .................. 726/10 |
| 2007/0038857 A1 * | 2/2007 | Gosnell ....................... 713/165 |
| 2008/0172713 A1 * | 7/2008 | Kamendje et al. .............. 726/1 |

\* cited by examiner

*Primary Examiner*—Kimyen Vu
*Assistant Examiner*—April Y Shan
(74) *Attorney, Agent, or Firm*—Shumaker & Sieffert, P.A.

(57) ABSTRACT

An intermediate network device includes a local caching module that caches user information from a remote server before a local user requests the information. In particular, the local caching module securely obtains and caches one-time passwords for a local user. The local caching device maintains separate sets of one-time passwords for each user. The local caching module may access the locally cached one-time passwords to authenticate a local user to a resource protected by a one-time password.

29 Claims, 5 Drawing Sheets

LOCAL CACHING OF ONE-TIME USER PASSWORDS

TECHNICAL FIELD

The invention relates to computer networks, and, more particularly, to techniques for password management.

BACKGROUND

Most enterprise networks require password-based authentication of users to permit access to network resources. In many networks, a user is initially assigned a password and then permitted to change the password as desired. A user may use a password for several days or weeks before changing the password. In contrast, some networks require the use of a one-time password (OTP) for access to network resources. Typically, a one-time password is only valid for a limited time before it expires. In some cases, the time before expiration may be a matter of seconds. OTPs are useful in preventing replay attacks on network computing systems. In a replay attack, an eavesdropper obtains authentication information such as usernames and passwords of legitimate users, and uses the authentication information at a later time to gain access to network resources.

In many cases, users carry small devices that generate and display partial passwords that match partial passwords generated by a central OTP server. In particular, the devices and the OTP server generate sequences of partial one-time passwords for application by a user in successive authentication attempts. The device and the OTP server may use a secure hash function to generate a unique sequence of partial OTPs for each user.

To access a network resource protected by an OTP, a user combines a partial OTP displayed by the device with a personal identification number recognized by the OTP server. This combination constitutes an OTP. After combining the partial OTP generated by the device with the personal identification number, the user submits the resulting full OTP to the OTP server. The OTP server then validates the OTP and grants or rejects access to the protected resource.

SUMMARY

In general, the invention is directed to techniques for management of one-time passwords in which one-time password data is cached in a local caching module that is readily accessible by a client device. In particular, the local caching module receives a set of one-time passwords (OTPs) for a user from a remote OTP server. The OTPs may be a unique sequence of OTPs generated for the user, and may be stored with a username for the user.

When the user accesses the local network device to make an authentication request, the local network device forwards the request to the remote OTP server or serves the authentication request locally using the locally cached username and OTPs. The local network device may be configured to perform local authentication when the network connection to the remote OTP server is delayed or interrupted.

The local caching module may store sets of username and OTP data for multiple users simultaneously. In addition, the local caching module may be integrated with other network functionality, and form part of an intermediate network device, such as a virtual private network (VPN) device, edge router, firewall device, switch, remote access, wireless local area network (WLAN) device or a combination thereof.

In one embodiment, the invention is directed to a method comprising obtaining one-time passwords from a remote one-time password server, storing the one-time passwords in a local cache associated with an intermediate network device, and accessing the local cache to process a network authentication request received from a client device associated with a local user.

In another embodiment, the invention is directed to a system comprising a one-time password server that stores one-time passwords, a client device associated with a local user, and an intermediate network device having a local caching module that obtains one-time passwords from the one-time password server, stores the one-time passwords in a local cache, and accesses the local cache to process a network authentication request received from a client device associated with a local user.

In another embodiment, the invention is directed a network device comprising a data acquisition element that obtains one-time passwords from a one-time password server, a local cache that stores the one-time passwords, and an authentication element that accesses the local cache to process a network authentication request received from a client device associated with a local user.

In another embodiment, the invention is directed to a computer-readable medium comprising instructions that cause a programmable processor to obtain one-time passwords from a remote one-time password server, store the one-time passwords in a local cache associated with an intermediate network device, and access the local cache to process a network authentication request received from a client device associated with a local user.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
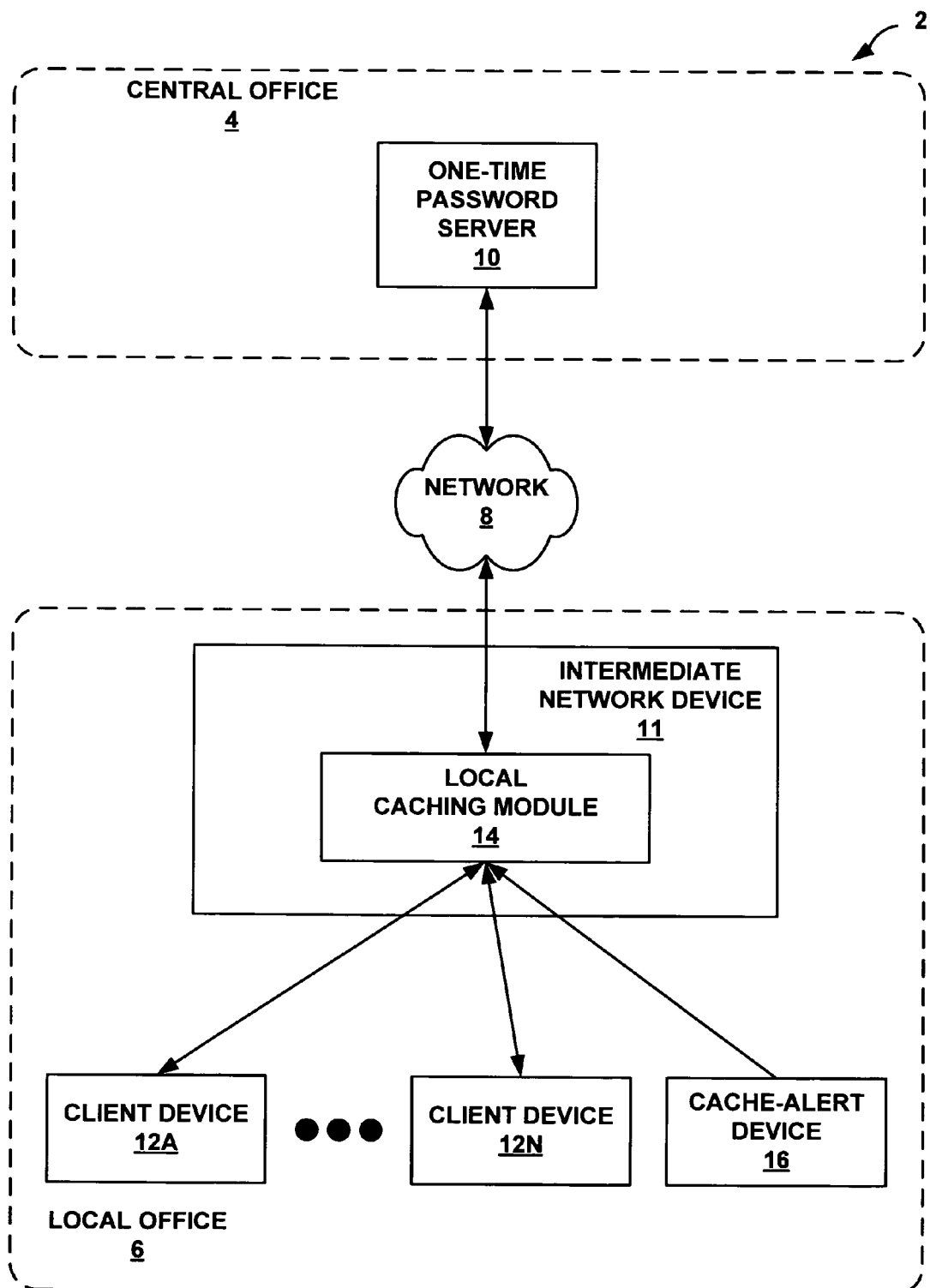
FIG. 1 is a block diagram illustrating an exemplary system in which a local caching module caches one-time passwords.

FIG. 1 is a block diagram illustrating an exemplary system 2 incorporating a central one-time password (OTP) server 10, an intermediate network device 11, one or more client devices 12A-12N, and a local caching module 14. As will be described, local caching module 14 may be associated with intermediate network device 11, and stores authentication information for a user so that remote authentication by central OTP server 10 is not always necessary. The authentication information may include a username, a sequence of OTPs generated by OTP server 10, and OTP configuration parameters. With local caching module 14, a user may be locally authenticated for access to network resources, avoiding problems associated with remote authentication when a network connection to OTP server 10 is delayed or interrupted.

As further shown in FIG. 1, system 2 comprises a central office network 4, a local office network 6, and a wide-area network 8. Central office network 4 and local office network 6 may be local area networks (LANs). Network 8 may be a public or private wide area network or a public global network such as the Internet. Central office network 4 contains OTP server 10. OTPs are passwords that are only valid for a user once or for a short period of time. OTP server 10 generates a set of OTPs for each potential user of a network resource.

Local office network 6 contains client devices 12A through 12N (collectively, client devices 12). Client devices 12 may be any type of network-capable computing device. For example, client device 12A may be a personal computer and client device 12B may be a personal digital assistant (PDA). Other devices such as mobile telephones, interactive televisions, VoIP Telephones, and Internet kiosks are also contemplated. Client devices 12 may be equipped for wired or wireless network access, or both wired and wireless network access. Users employ client devices 12 to access resources protected by OTPs generated by OTP server 10.

Local office network 6 also contains intermediate network device 11 and local caching module 14. Local caching module 14 is responsible for receiving and storing authentication information for multiple users on behalf of OTP server 10. Local caching module 14 may use the stored authentication information to authenticate users locally for access to network resources. Intermediate network device 11 may be situated between client devices 12 and OTP server 10, providing interconnection between local office network 6 and network 8. Intermediate network device 11 is situated in local office network 6 is such a way that local caching module 14 may observe, intercept, and inject network communications departing from local office network 6 to network 8 and network communications arriving at local office network 6 from network 8. In this sense, intermediate network device 11 and local caching module 14 are "in-line" with external communications between client devices 12 and external network resources on network 8.

Because of the positioning of intermediate network device 11 between client device 12 and network 8, local caching module 14 may be transparent to a user in local office 6. Furthermore, because of this positioning, intermediate network device 11 may be included within or include a firewall device, a virtual private network (VPN) server, a cache server, an edge router, a wide-area network optimization server, or another intermediate network device. Integrating local caching module 14 into intermediate networking device 11 may reduce the overall complexity of installing and maintaining local caching module 14. In addition, local office network 6 may include a cache-alert device 16, which will be described in further detail below.

When a user attempts to access a protected network resource through a client device 12, i.e., when the user makes an authentication request, client device 12 prompts the user for a username and OTP. After collecting this authentication information from the user, the client device 12 forwards a network authentication request to intermediate network device 11. In this case, local caching module 14 receives the network authentication request directly from client device 12. Alternatively, client device 12 may forward the network authentication request to OTP server 10. However, local caching module 14 may be configured to intercept the network authentication request to OTP server 10, which is facilitated by the positioning of intermediate network device 11 between client device 12 and network 8.

Local caching module 14 may be configured to locally process the authentication request if authentication information for the pertinent user is locally cached. If authentication information for the user is not locally cached, local caching module 14 forwards the authentication request to OTP server 10. As an alternative, local caching module 14 may be configured to forward the authentication request to OTP server 10 unless a network connection to the OTP server is delayed or interrupted. In the former example, the default for authentication is to handle the authentication device in local caching module 14 unless authentication information is not locally cached. In the latter example, the default for authentication is to forward the authentication request to OTP server 10 unless a network connection to OTP server 10 is not available.

For locally handled authentication requests, if local caching module 14 contains cached authentication information for a user, local caching module 14 retrieves the user's cached authentication information. Local caching module 14 then compares the username and OTP supplied by the user with the cached authentication information. If the username and OTP match, local caching module 14 permits the users to access the protected resource. In this manner, local caching module 14 provides local authentication of the username and OTP, avoiding the need to interact with remote OTP server 10.

As indicated above, local caching module 14 may be particularly useful when the network connection to OTP server 10 is delayed or interrupted. In particular, a user is able to access desired network resources even when remote authentication is not possible due to network delay or interruption. In other cases, even if a network connection to OTP server 10 is available, local handling of authentication requests may nevertheless be useful in reducing authentication latency.

Alternatively, if local caching module 14 does not contain cached authentication information for the user, local caching module 14 sends an authentication request across network 8 to OTP server 10 for access to authentication information for the user. In addition to retrieving the OTP for a current authentication request, local caching module 14 also retrieves OTPs from OTP server 10 that will become valid later. In this way, local caching module 14 builds a cache of authentication information for the users. For each new user that attempts to authenticate, local caching module 14 may repeat these steps. Alternatively, local caching module 14 may periodically obtain authentication information for multiple users. In either case, local caching module 14 may eventually contain authentication information for a large number of users.

Local caching module 14 also may be configured to retrieve additional OTPs from OTP server 10 when the number of valid cached OTPs for a user has dropped below a threshold number. For example, if there are less than N (e.g., 2) OTPs remaining in the local cache for a particular user, local caching module 14 may interact with remote OTP server 10 to replenish the number of OTPs available for local users. In this manner, local caching module 14 may avoid exhaustion of OTPs for local users, and the need to access OTP server 10 in response to an authentication attempt. Instead, local caching module 14 maintains a sufficient number of OTPs to serve a reasonable number of future authentication attempts for each user.

Cache-alert device 16 may be provided to improve the efficiency of the above described local caching approach. Waiting for a user to attempt authentication before retrieving the set of OTPs requires that the user wait while local caching module 14 retrieves the passwords. The user may wait indefinitely if network 8 is highly congested or is not functioning.

Cache-alert device 16 alleviates this problem to some measure by providing information to local caching module 14 indicating that a user will likely attempt to authenticate in the future.

For example, suppose that the user is an employee at an office. To enter the office, the employee must swipe a badge through a card reader. The card reader, acting as cache-alert device 16, reports this action to local caching module 14, e.g., via a local area network (LAN) connection. Because the employee is likely entering the office to work, local caching module 14 retrieves the OTPs that permit the user to access the protected resources needed for the employee's work. Accordingly, by the time the employee arrives at his desk, it is possible that local caching module 14 has already obtained a set of one or more OTPs for the particular employee user.

Also, cache-alert device 16 may be helpful in obtaining OTPs for visiting users. For example, local caching module 14 may maintain an updated set of OTPs for users known to be associated with a particular local office 6. When a user from a different office visits local office 6, however, it is necessary to obtain OTPs for the visiting users. Cache-alert device 16 may be configured to detect the presence, arrival or intended future arrival of a visiting user to a local office 6, and trigger local caching module 14 to obtain pertinent authentication information from OTP server.

In particular, cache-alert device 16 may rely on a card reader, as described above. Alternatively, cache-alert device 16 may be responsive to user input entered by a user within local office 6 who has been advised that another user will be visiting the local office. As a further example, cache-alert device 16 may be responsive to a message transmitted by the visiting user. In either case, cache-alert device 16 may trigger retrieval of OTP information from OTP server 10 by local caching module 14 so that local authentication is readily available to the visiting user.

As another example, cache-alert device 16 may make use of information obtained using a satellite navigation system device such as a global position system (GPS) device. When a user enters a specific zone as determined by the GPS device, the GPS device alerts local caching module 14 of the user's new location, e.g., via a combination of wireless and wired network connections. Local caching module 14 then retrieves the authentication information for the user from OTP server 10. In this case, cache alert device 16 uses the GPS information to trigger retrieval of authentication information by local caching module 14.

A GPS-based implementation of cache alert device 16 may be useful for military personnel who need maximum security and maximum speed of access to information. Local caching module 14 may be installed at a local base while OTP server 10 might be in the home country. Soldiers on patrol may then use OTPs cached at local caching module 14 to authenticate for access to network resources. This process may be quicker than sending authentication requests back to OTP server 10. This is because the distance between the soldiers and local caching module 14 is less and the database of authentication information on local caching module 14 is likely smaller than the database on one-time password server 10. Further, pre-caching OTPs may be especially valuable in a war zone where communication links, including links to remote OTP server 10, may be fragile.

Users may employ similar methods with wireless networks. For example, suppose that cache-alert device 16 learns that a user is within range of a Wireless-Fidelity "hotspot." In this case, cache-alert device 16 may send alerts that prompt local caching devices in surrounding hotspots to cache OTPs for the user. In this way, if the user moves to one of the surrounding hotspots, a local caching device in that hotspot has OTPs waiting for the user. Cache-alert device 16 may perform similar functions when a user is located within range of wireless local area networks (WLAN), world wide interoperability for microwave access (WiMAX) networks, wireless broadband (WiBro) networks, broadband wireless access (BWA) networks, high performance radio metropolitan area networks (HIPERMAN), cellular networks, and other wireless networking technologies.

Local caching module 14 may use a combination of factors to determine whether to retrieve a set of OTPs for a user. For example, cache alert device 16 may be configured to receive scheduling information about a user, such as travel itinerary and travel purpose information. If cache-alert device 16 detects that a user has purchased a plane ticket to a city where local caching module 14 is located, the cache alert device may alert local caching module 14 to retrieve OTP information for the user. If cache alert device 16 also receives information indicating that the user has scheduled a vacation on the date of travel, however, the cache alert device may cancel the alert to local caching module. In this case, cache alert device 16 determines that the user is probably not traveling to the city to visit the branch office. Consequently, local caching module 14 does not obtain OTPs for the user.

The intelligence for interpreting travel information or alerts may be built into cache alert device 16 or local caching module 14 in the form of one or more software processes. Also, local caching module 14 may be responsive to multiple cache alert devices 16. Each time local caching module 14 receives information from cache-alert device 16, local caching module 14 may recalculate the probability that a user will attempt to use local caching module 14 to authenticate in the near future.

If the probability is above a certain threshold, then local caching module 14 obtains the OTPs from OTP server 10. In some embodiments, local caching module 14 may cache the OTPs based only on the user's travel to the vicinity of the local office 6 without regard to travel purpose. In addition, multiple local caching modules 14 associated with multiple local offices 6 in a particular region may simultaneously cache authentication information for the same user, providing sufficient regional OTP caching coverage in the event the user visits one of the offices in the region.

By locally storing OTPs, local caching module 14 facilitates relatively quick and reliable username and password authentication for multiple users. Further, caching OTPs locally rather than generating OTPs locally eliminates the costs of installing an OTP server at each local office. In addition, caching OTPs at a local server, as opposed to on client devices 12, frees a user from dependence on a single client device.

Figure 2:
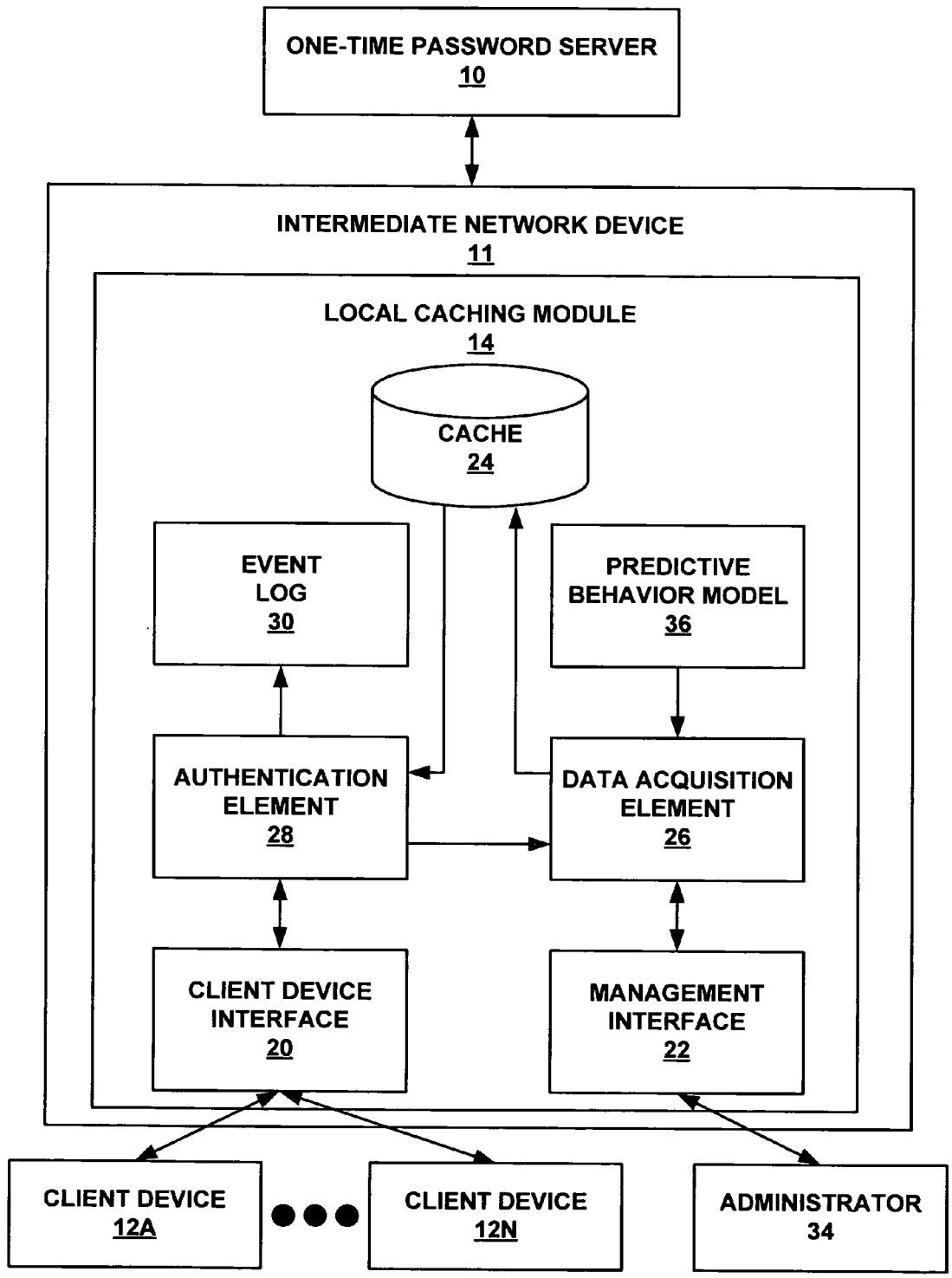
FIG. 2 is a block diagram illustrating an exemplary embodiment of a local caching module configured to locally cache one-time passwords.

FIG. 2 is a block diagram illustrating an exemplary embodiment of intermediate network device 11 and local caching module 14. As shown in FIG. 2, local caching module 14 has a client device interface 20 and a management interface 22. Internally, local caching module 14 contains a cache 24, a data acquisition element 26, an authentication element 28, an event log 30, and a predictive behavior model 36. The various components of local caching module 14 may be implemented in hardware, firmware, software of any combination thereof. Aspects implemented in software may be embodied as instructions executable by one or more processors, such as a microprocessor, microcontroller or digital signal processor (DSP). Aspects implemented in hardware or software may be implemented by discrete or integrated logic circuitry, such as an application specific integrated circuit (ASIC), field programmable gate array (FPGA), and associated memory.

When a user attempts to access a resource protected by OTP-based authentication, a client device, such as client device 12A, submits a network authentication request to client device interface 20. Alternatively, if client device 12A sends the authentication request to OTP server 10, client device interface 20 intercepts the authentication request before the authentication request leaves local office 6. The authentication request may simply contain a traditional username and OTP. From the perspective of the user, supplying the username and OTP would be the same regardless of whether or not local caching module 14 pre-caches OTPs for the user from OTP server 10. Client device interface 20 forwards the received or intercepted authentication request to authentication element 28.

Authentication element 28 determines whether to grant or deny the authentication request. Specifically, when authentication element 28 receives an authentication request containing a username and OTP from client device interface 20, authentication element 28 attempts to find an entry in cache 24 associated with the username. Each entry in cache 24 consists of a set of OTPs. If cache 24 contains an entry associated with the username, authentication element 28 retrieves the set of OTPs associated with the username from cache 24. On the other hand, if cache 24 does not contain an entry associated with the username supplied by the user, authentication element 28 alerts data acquisition element 26. Data acquisition element 26 obtains OTPs from OTP server 10 on behalf of authentication element 28. After retrieving the set of OTPs, authentication element 28 compares a current OTP against the OTP supplied by the user. If the OTPs match, authentication element 28 permits the user to access the requested resource. Regardless of whether the OTPs match, authentication element 28 records the authentication request in event log 30.

When local caching module 14 receives information about a user from cache-alert device 16, data acquisition element 26 calculates the likelihood that, given the received information, the user will attempt to use local caching module 14 to authenticate. Specifically, data acquisition element 26 provides the information to predictive behavior model 36. Predictive behavior model 36 contains a set of condition-action rules describing probable behaviors of users. For example, predictive behavior model 36 may contain a rule stating that, given that a user swiped an identity card through a badge reader, there is a 75% chance that the user will send an authentication request in the next 30 minutes.

The condition-action rules in predictive behavior model 36 may be significantly more complex. For instance, a rule may use input from several cache-alert devices when calculating probabilities. Data acquisition element 26 determines whether the probability exceeds a given threshold. If the probability exceeds the threshold, data acquisition element 26 requests a set of OTPs for the user from OTP server 10. For example, if the probability exceeds 50%, then data acquisition element 26 sends the request to OTP server 10.

Local caching module 14 may also receive authentication information from OTP server 10 without first requesting the authentication information. In other words, OTP server 10 may push authentication information to local caching module. The ability to receive the authentication information without first requesting the authentication information may be useful for a number of reasons. For example, suppose that a cache-alert device detects that a user has left a first area traveling in the direction of a geographically separate second area. The cache-alert device may send an alert to OTP server 10. In response to the alert, OTP server 10 could send OTPs for the user into a local caching device in the second area. In this way, the local caching device in the second area may have the OTPs waiting for the user before the user enters the second area.

Further, an administrator may configure OTP server 10 to automatically distribute authentication information to some or all local offices in the enterprise. Specifically, whenever OTP server 10 generates a new OTP for a user, OTP server 10 sends the new OTP to each local caching module in the enterprise. In other words, each local caching module possesses a copy of OTPs and OTP configuration parameters for each user. This simplified configuration gives the enterprise the benefits of having local OTP authentication without having to install an OTP server at each local office in the enterprise. Moreover, this configuration may be especially efficient when the number of users in the enterprise is low or where the cost of installing cache alert devices is high. However, distributing authentication information for all users to all local offices may engender greater security risks and the OTPs may consume considerable amounts of storage space.

Management interface 22 allows an administrator 34 to configure local caching module 14. For example, management interface 22 allows administrator 34 to determine whether authentication element 28 searches the local cache first to serve an authentication request or forwards the authentication request to OTP server 10 first. Forcing authentication element 28 to forward the authentication request to OTP server 10 may be more secure than processing the authentication request locally.

Management interface 22 further allows administrator 34 to perform operations on cache 24. Specifically, administrator 34 may use management interface 22 to set a time limit for how long an entry can remain in cache 24. For example, administrator 34 could specify that data acquisition element 26 should purge all entries in cache 24 older than 24 hours. In addition, administrator 34 may use management interface 22 to remove specific entries in cache 24. Removing a specific entry may be necessary if a user loses access rights to a protected resource before an entry in cache 24 associated with the user expires. Further, administrator 34 may use management interface 22 to cause data acquisition element 26 to retrieve authentication information for a specific user from OTP server 10. The ability to cause data acquisition element 26 to retrieve authentication information for a specific user may be especially useful when administrator 34 knows in advance that a particular visitor may use protected resources from local office 6.

Administrator 34 may also use management interface 22 to review authentication request activity on local caching module 14. In particular, management interface 22 provides administrator 34 with a means to view the content of event log 30. Reviewing event log 30 may be useful for security purposes. For example, if administrator 34 notices a series of authentication failures for a given username in event log 30, administrator 34 may conclude that someone is attempting to improperly gain access to a resource. Administrator 34 then has the option of taking appropriate security precautions.

Data acquisition element 26 communicates securely with OTP server 10. Because network 8 is public, a malicious user could pretend to be local caching module 14 in order to receive blocks of OTPs. The malicious user could then use the passwords to illegitimately access resources. To prevent this, data acquisition element 26 includes certificates issued by a party trusted by both local caching module 14 and OTP server 10. In addition, data acquisition element 26 may implement a virtual private network (VPN) to ensure that communication is secure between OTP server 10 and local caching module 12.

Figure 3:
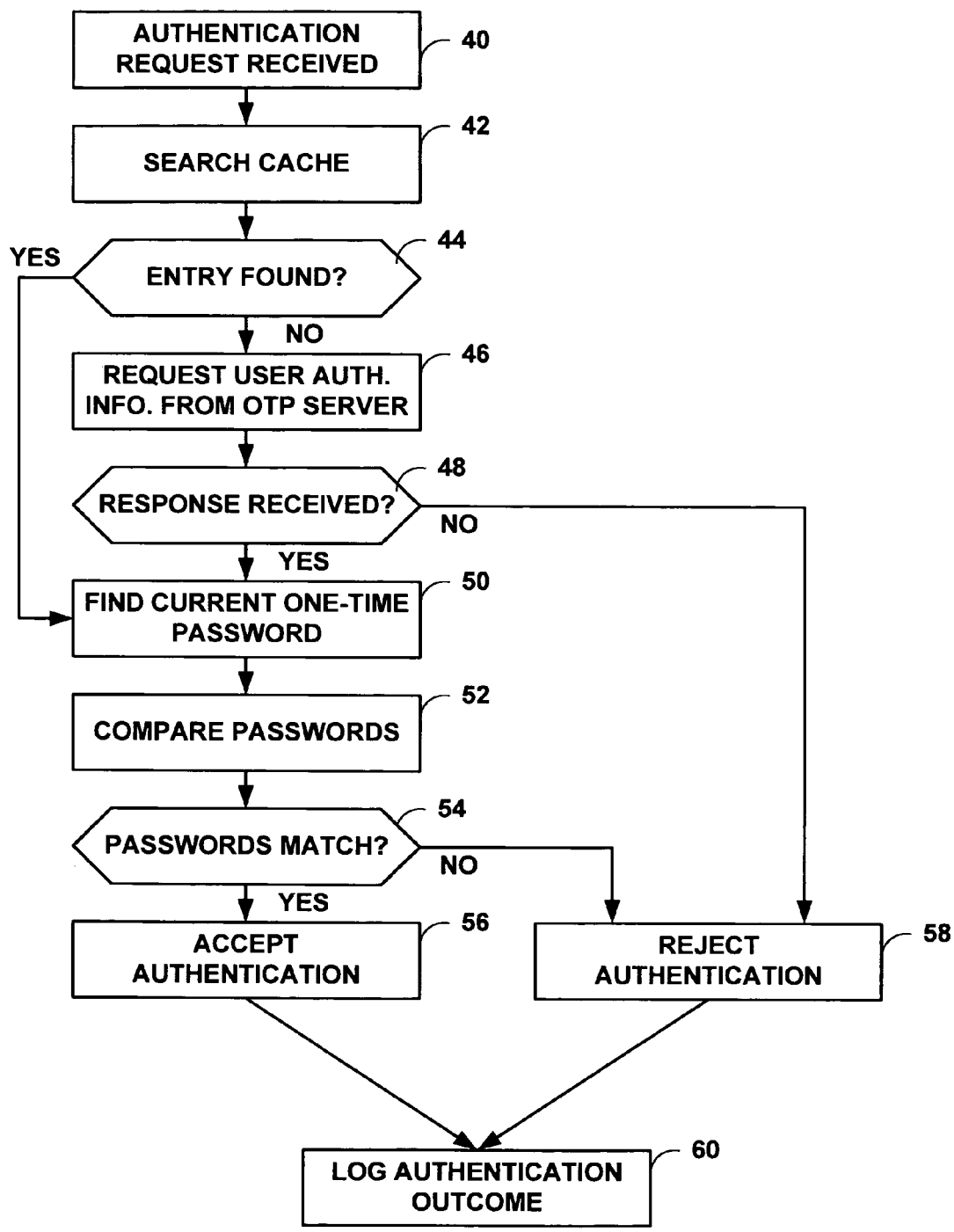
FIG. 3 is a flowchart illustrating an exemplary method of authenticating a one-time password using a local caching module.

FIG. 3 is a flowchart illustrating an exemplary mode of operation of local caching module 14 in response to an authentication request in accordance with the principles of this invention. An authentication process begins when local caching module 14 receives or intercepts an authentication request from a local user (40). Specifically, the authentication request contains a username and OTP supplied by the user through client device interface 20 of local caching module 14.

Authentication element 28 of local caching module 14 uses the username of the authentication request to search local cache 24 for a matching username (42). If authentication element 28 cannot find a matching username in cache 24 (44), data acquisition element 26 requests authorization information for the user from OTP server 10 (46). If local caching module 14 does not receive a response from OTP server 10 before a timeout expires (48), local caching module 14 considers the connection between local caching module 14 and OTP server 10 to have failed. Because local caching module 14 is unable to validate the user, local caching module 14 rejects the authentication request (58) and logs the outcome of the authentication request in event log 30 as a failure (60).

On the other hand, if local caching module 14 receives a response from OTP server 10, local caching module 14 finds a current OTP for the user in the set of OTPs returned by OTP server 10 (50). This is the same as if local caching module 14 had found an entry in cache 24 for the username supplied by the user. To find the current OTP, local caching module 14 may use the OTP configuration parameters sent by OTP server 10. For example, the OTP configuration parameters may instruct local caching module 14 that OTPs expire periodically after a given time. Further, the OTP configuration parameters may instruct local caching module 14 that users may only use OTPs once. In addition, OTP configuration parameters may specify times when each OTP expires.

After finding the current OTP, local caching module 14 compares this OTP with the OTP supplied by the user (52). If the OTPs match (54), local caching module 14 accepts the authentication request and allows the user to access the protected resource (56). Else, if the OTPs do not match (54), local caching module 14 rejects the authentication request and denies access (58). In either case, local caching module 14 records the outcome of the authentication request, i.e., allowance or rejection of access, in event log 30 (60).

Figure 4:
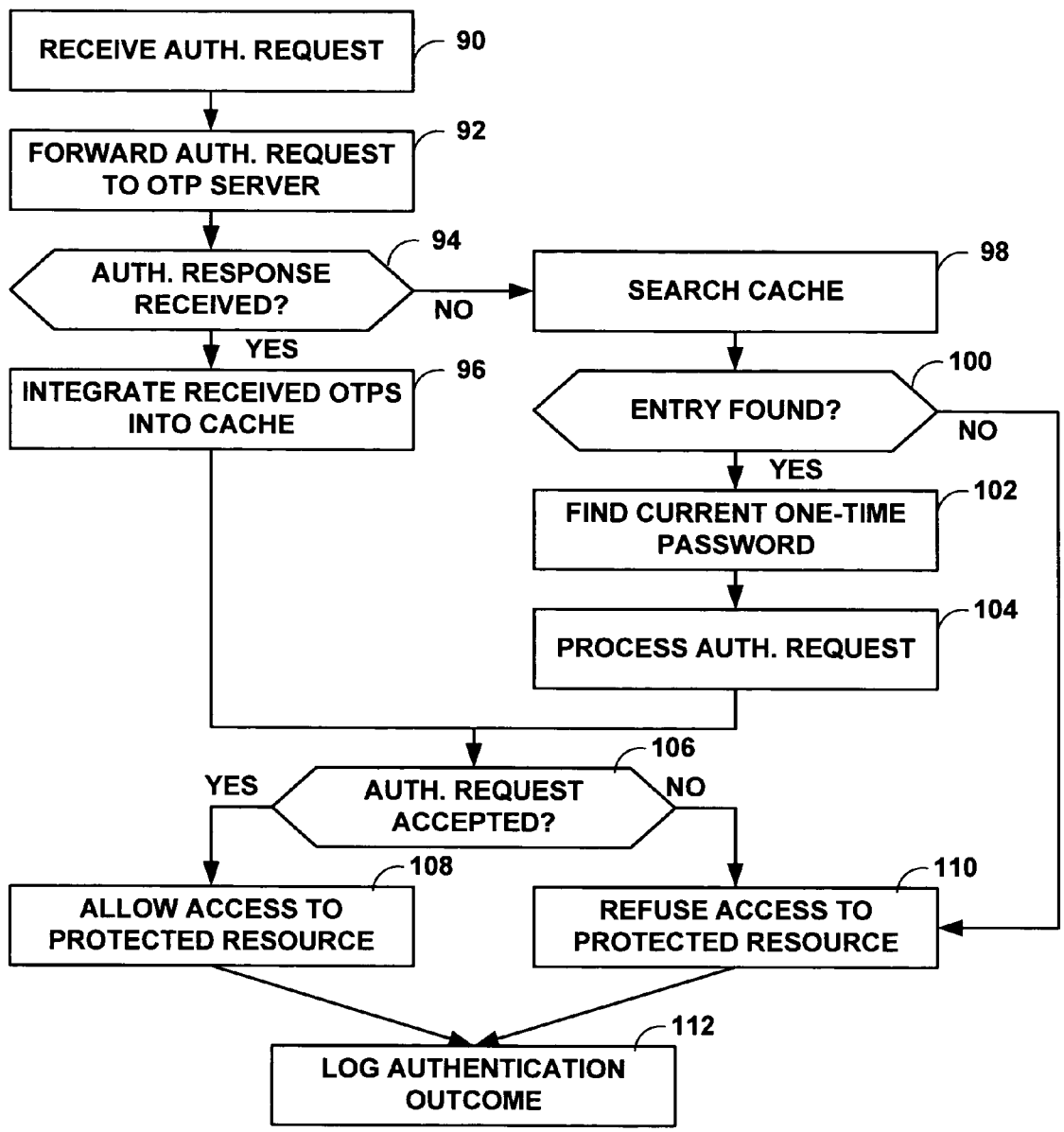
FIG. 4 is a flowchart illustrating an exemplary mode of retrieving one-time passwords from a one-time password server for caching within a local caching module.

FIG. 4 is a flowchart illustrating an exemplary alternate operation of local caching module 14 in response to an authentication request in accordance with the principles of this invention. An authentication process begins when local caching module 14 receives an authentication request from a local user to use a resource protected by a one-time password (90). In this embodiment, local caching module 14 forwards the authentication request to OTP server 10 (92). Local caching module 14 then waits for an authentication response from OTP server 10. If local caching module 14 receives an authentication response from OTP server 10 (94), local caching module 14 integrates any OTPs accompanying the authentication response into cache 24 (96). Local caching module 14 then examines the authentication response to determine whether OTP server 10 accepted the authentication request (106). If OTP server 10 accepted the authentication request, local caching module 14 allows the user access to the protected resource (108). On the other hand, if OTP server 10 did not accept the authentication request, local caching module 14 refuses to allow the user access to the protected resource (110). Local caching module 14 then logs the result of the authentication request in event log 30 (112).

If, however, local caching module 14 does not receive an authentication response from OTP server 10, local caching module 14 searches cache 24 for a set of OTPs associated with the user (98). If local caching module 14 cannot find an entry (100), local caching module 14 rejects the authentication request (110) and logs this rejection in event log 30. On the other hand, if local caching module 14 finds any entry in cache 24 for the user (100), local caching module 14 determines which OTP in the series of cached OTPs for the user is the current OTP (102). After determining the current OTP, local caching module 14 uses the current OTP to process the authentication request (104). If local caching module 14 accepts the authentication request given the current OTP (106), local caching module 14 allows the user access to the protected resource (108). If local caching module 14 does not accept the authentication request (106), local caching module 14 refuses to allow the user access to the protected resource (110). Regardless of the whether local caching module 14 allows the user to access the protected resource, local caching module 14 logs the outcome of the authentication request in event log 30 (112).

Figure 5:
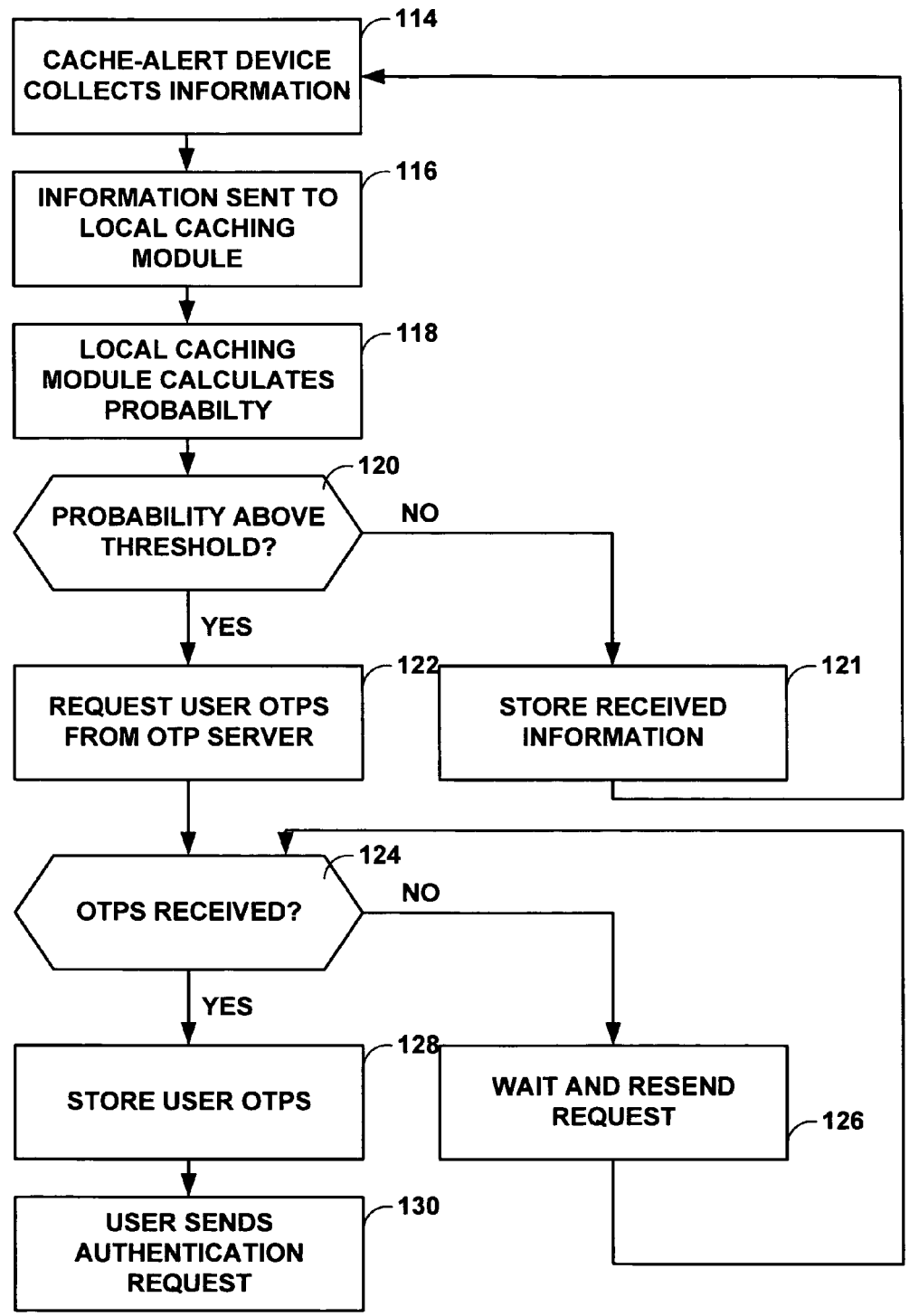
FIG. 5 is a flowchart illustrating an exemplary mode of operation for pre-caching OTPs in a local caching module in accordance with the principles of this invention.

FIG. 5 is a flowchart illustrating an exemplary mode of operation for pre-caching OTPs in local caching module 14 in accordance with the principles of this invention. Cache-alert device 16 collects information about the activities of users (114). For example, the information could concern an employee swiping a badge through a card reader or a soldier entering a certain area. After collecting information about a user, cache-alert device 16 sends the information to local caching module 14 (116).

When local caching module 14 receives the information about the user, local caching module 14 calculates the probability that the user will attempt to authenticate using local caching module 14 in the near future (118). If the probability is not above a threshold (120) local caching module 14 stores the event information (121). Local caching module 14 uses stored information as a factor in calculating the probability when local caching module 14 next receives data.

If the probability is above the threshold (120), local caching module 14 requests a set of OTPs from OTP server 10 for the user (122). If local caching module 14 does not receive a response from OTP server 10 within a given period (124), local caching module 14 waits and then resends the request for OTPs for the user (126). After resending the request, local caching module 14 again checks whether local caching module 14 has received OTPs for the user from OTP server 10 (124). When local caching module 14 receives the OTPs for the user, local caching module 14 stores the OTPs in cache 24 (128). At any point after local caching module 14 has stored the OTPs for the user, the user may send an authentication request to local caching module 14 (130), in which case the authentication request may be locally served by local caching module 14 or served remotely by OTP server 10.

Various embodiments of the invention have been described. These and other embodiments are within the scope of the following claims.

The invention claimed is:

1. A method comprising:
   determining that a probability that a local user will send a network authentication request is above a threshold;
   obtaining, by an intermediate network device comprising a microprocessor, a sequence of one-time passwords generated for the local user from a remote one-time password server based on the determination;

storing the sequence of one-time passwords in a local cache associated with the intermediate network device;

accessing the local cache in response to the network authentication request received from a client device associated with the local user to select a current one-time password from the sequence of one-time passwords in the local cache; and determining, by the intermediate network device comprising the microprocessor, whether to grant the network authentication request by comparing a one-time password specified by the network authentication request to the current one-time password selected from the sequence of one-time passwords.

2. The method of claim 1, wherein accessing the local cache comprises accessing the local cache in response to the network authentication request only when a network connection from the intermediate network device to the one-time password server is unavailable.

3. The method of claim 1, further comprising forwarding the network authentication request from the intermediate network device to the one-time password server when a network connection to the one-time password server is available.

4. The method of claim 1, wherein obtaining one-time passwords comprises obtaining the sequence of one-time passwords from the remote one-time password server without sending a request for the sequence of one-time passwords.

5. The method of claim 1, wherein determining that the probability that the user will send the network authentication request is above the threshold comprises:
receiving data about activities of the local user; and
processing the data with a predictive behavior model to determine whether the probability that the local user will send the network authentication request is above the threshold.

6. The method of claim 5, wherein the predictive behavior model comprises a set of condition-action rules.

7. The method of claim 1, further comprising allowing an administrator to control storage of the sequence of one-time passwords within the local cache.

8. The method of claim 7, further comprising obtaining the sequence of one-time passwords for the local user from the remote one-time password server upon a request from the administrator.

9. The method of claim 1, further comprising determining whether the current one-time password has expired and, when the current one-time password is determined to have expired, selecting a next one of the sequence of one-time passwords as the current one-time password.

10. The method of claim 1, wherein obtaining the sequence of one-time passwords comprises maintaining a number of valid one-time passwords for the local user and requesting additional one-time passwords for the local user from the one-time password server when the number of valid one-time passwords in the cache for the local user has dropped below a threshold number.

11. A system comprising:
a one-time password server that generates a sequence of one-time passwords for a local user;
a client device associated with the local user; and
an intermediate network device comprising a microprocessor and a local caching module that includes a data acquisition module that obtains the sequence of one-time passwords from the one-time password server based on a determination that a probability that the local user will send the network authentication request is above a threshold, wherein the local caching module stores the sequence of one-time passwords in a local cache, accesses the local cache in response to a network authentication request received from the client device associated with the local user to select a current one-time password from the sequence of one-time passwords in the local cache,
wherein the intermediate network device determines whether to grant the network authentication request by comparing a one-time password specified within the network authentication request to the current one-time password selected from the sequence of one-time passwords.

12. The system of claim 11, wherein the local caching module accesses the local cache in response to the network authentication request only when a network connection from the intermediate network device to the one-time password server is unavailable.

13. The system of claim 11, wherein the local caching module forwards the network authentication request to the one-time password server when a network connection from the intermediate network device to the one-time password server is available.

14. The system of claim 11, wherein the one-time password server distributes the sequence of one-time passwords to the local caching module without a request for the sequence of one-time passwords from the local caching module.

15. The system of claim 11, wherein the local caching module stores a predictive behavior model for calculating whether the probability that the local user will send the network authentication request is above the threshold, and wherein when the predictive behavior model indicates that the probability that the local user will send the network authentication request is above the threshold, the data acquisition element sends a request to the remote one-time password server to send the sequence of one-time passwords associated with the local user.

16. The system of claim 15, wherein the predictive behavior model comprises a set of condition-action rules.

17. The system of claim 15, further comprising a cache-alert device that supplies information relevant to determining whether the network authentication request is likely to be received in the near future.

18. The system device of claim 11, further comprising a management interface through which an administrator of the intermediate network device controls behavior of the local caching module.

19. The system of claim 11, further comprising a client device interface that intercepts the network authentication request on behalf of the local caching module.

20. The system of claim 11, wherein the local caching module determines whether the current one-time password has expired and, when the local caching module determines that the current one-time password has expired, the local caching module is configured to select a next one of the sequence of one-time passwords as the current one-time password.

21. The system of claim 11, wherein the local caching module includes a data acquisition element that maintains a number of valid one-time passwords for the local user and retrieves additional one-time passwords for the local user from the one-time password server when the number of valid cached one-time passwords for the local user has dropped below a threshold number.

22. An intermediate network device comprising:
a microprocessor;
a data acquisition element executing on the microprocessor that obtains a sequence of one-time passwords generated for a local user from a one-time password server based on a determination that a probability that the local user will send a network authentication request is above a threshold;

a local cache that stores the sequence of one-time passwords; and an authentication element executing on the microprocessor that accesses the local cache in response to the network authentication request received from a client device associated with a local user to select a current one-time password from the sequence of one-time passwords in the local cache, wherein the authentication elements determines whether to grant the network authentication request by comparing a one-time password specified within the network authentication request to the current one-time password selected from the sequence of one-time passwords.

23. The intermediate network device of claim 22, wherein the authentication element accesses the local cache in response to the network authentication request only when a network connection from the network device to the one-time password server is unavailable.

24. The intermediate network device of claim 22, wherein the local caching module forwards the network authentication request to the one-time password server when a network connection from the network device to the one-time password server is available.

25. The intermediate network device of claim 22, wherein the data acquisition element maintains a number of valid one-time passwords for the local user and retrieves additional one-time passwords for the local user from the one-time password server when the number of valid cached one-time passwords for the local user has dropped below a threshold number.

26. A non-transitory computer-readable medium comprising instructions that cause a programmable microprocessor of an intermediate network device to:

obtain a sequence of one-time passwords generated for a local user from a remote one-time password server based on a determination that a probability that the local user will send a network authentication request is above a threshold;

store the sequence of one-time passwords in a local cache associated with the intermediate network device;

access the local cache in response to the network authentication request received from a client device associated with the local user to select a current one-time password from the sequence of one-time passwords in the local cache; and determine whether to grant the network authentication request by comparing a one-time password specified within the network authentication request to the current one-time password selected from the sequence of one-time passwords.

27. The method of claim 1, wherein the one-time passwords in the sequence expire at different respective times, and wherein obtaining the sequence of one-time passwords comprises determining a number of one-time passwords to obtain such that at least one of the sequence of one-time passwords will be valid for a predetermined period of time from a current time.

28. The method of claim 1, wherein the one-time passwords in the sequence expire after a single use by the local user, and wherein obtaining the sequence of one-time passwords comprises obtaining a number of one-time passwords such that a predetermined number of authentication requests can be granted for the local user.

29. A system comprising:

a central office network comprising a one-time password server configured to generate a sequence of one-time passwords for a local user; and a local office network comprising a client device associated with the local user and an intermediate network device connected to the client device and connected to the one-time password server, wherein the intermediate network device is configured to obtain the sequence of one-time passwords from the one-time password server based on a determination that a probability that the local user will send the network authentication request is above a threshold, to store the sequence of one-time passwords in a local cache of the intermediate network device, to receive a network authentication request from the client device, and, in response to the network authentication request, to determine whether a connection between the intermediate network device and the one-time password server is available, wherein the intermediate network device comprising a microprocessor is configured to send the network connection request to the one-time password server without accessing the local cache when the connection is determined to be available, and wherein the intermediate network device is configured to select a current one-time password from the sequence of one-time passwords in the local cache when the connection is determined not to be available and to determine whether to grant the network authentication request by comparing a one-time password specified within the network authentication request to the current one-time password selected from the sequence of one-time passwords.

* * * * *